(12) United States Patent
Huston et al.

(10) Patent No.: US 7,302,145 B2
(45) Date of Patent: Nov. 27, 2007

(54) SELF-HEALING CABLE APPARATUS AND METHODS

(75) Inventors: Dryver Huston, South Burlington, VT (US); Brian Esser, Colchester, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 0 days.

(21) Appl. No.: 11/362,611

(22) Filed: Feb. 27, 2006

(65) Prior Publication Data

US 2006/0193569 A1     Aug. 31, 2006

Related U.S. Application Data

(60) Provisional application No. 60/656,735, filed on Feb. 25, 2005.

(51) Int. Cl.
*G02B 6/44* (2006.01)
(52) U.S. Cl. .................. 385/100; 385/101; 385/106
(58) Field of Classification Search ............. 385/100
See application file for complete search history.

(56) References Cited

U.S. PATENT DOCUMENTS

| 5,202,186 | A | 4/1993 | Williamson |
| 5,862,030 | A | 1/1999 | Watkins |
| 6,184,473 | B1 | 2/2001 | Reece et al. |
| 6,233,384 | B1 * | 5/2001 | Sowell et al. ............... 385/107 |
| 6,573,456 | B2 | 6/2003 | Spruell |
| 2005/0136257 | A1 | 6/2005 | Easter |

* cited by examiner

*Primary Examiner*—Jennifer Doan
(74) *Attorney, Agent, or Firm*—Opticus IP Law PLLC

(57) ABSTRACT

Self-healing cable apparatus and methods are disclosed. The cable has a central core surrounded by an adaptive cover that can extend over the entire length of the cable or just one or more portions of the cable. The adaptive cover includes a protective layer having an initial damage resistance, and a reactive layer. When the cable is subjected to a localized damaging force, the reactive layer responds by creating a corresponding localized self-healed region. The self-healed region provides the cable with enhanced damage resistance as compared to the cable's initial damage resistance. Embodiments of the invention utilize conventional epoxies or foaming materials in the reactive layer that are released to form the self-healed region when the damaging force reaches the reactive layer.

18 Claims, 6 Drawing Sheets

SELF-HEALING CABLE APPARATUS AND METHODS

CROSS-REFERENCE TO RELATED APPLICATIONS

This application claims the benefit of priority under 35 U.S.C. § 119(e) of U.S. Provisional Patent Application Ser. No. 60/656,735, entitled "Adaptive protective covering for a conductor," filed on Feb. 25, 2005.

STATEMENT OF GOVERNMENTAL SUPPORT

This invention was made in part with U.S. Government support under Cooperative Agreement No. NCC5-581 by Vermont's NASA EPSCoR Program. The U.S. Government therefore has certain rights in this invention.

BACKGROUND OF THE INVENTION

1. Field of the Invention

The present invention relates generally to cables for a variety of applications (e.g., electrical, optical, fluid, gas, etc.), and particularly to cables having adaptive coverings that provide for self-healing when the cable is damaged.

2. Technical Background

Cable failures are a major concern in high-performance engineered systems such as cars, airplanes, boats, submarines, spacecraft, nuclear power plants, buildings, etc. For example, cabling problems on commercial and military aircraft have been implicated as the cause of accidents. Cable failures can occur for a number of reasons, such as the result of physical chafing, vibration, and wires in bundles rubbing against each other. These actions are examples of damaging forces that can cause a cable to become cracked and broken, and in the case of electrical wiring may cause shorts, sparks, incorrect signals, fire, and arcing, among many other possible electrical failures.

Even though cable failure poses a significant safety hazard in many different applications, cable inspection and repair remains difficult and expensive. Hidden cable damage is difficult to locate, and the cable inspection process itself can itself cause cable damage to the cable. Cable replacement is often quicker than diagnosis and repair.

SUMMARY OF THE INVENTION

One aspect of the invention is a self-healing cable apparatus. The cable includes a central conductor having a length, and an adaptive covering surrounding the conductor. The adaptive covering surrounds the conductor over at least over a portion the conductor's length. The adaptive covering includes a protective layer having an initial damage resistance, and a reactive layer. When a damaging force is applied to the cable over a limited area of the cable, the reactive layer responds so as to form a localized self-healed region corresponding in size and location to the limited area of the damaging force. The self-healed region has an enhanced damage resistance as compared to the initial damage resistance.

Another aspect of the invention is a method, of manufacturing a self-healing cable. The method includes providing a central conductor having a length, and engaging an adaptive covering with the conductor so as to surround the conductor over at least a portion of the conductor's length. The adaptive covering includes a protective layer having an initial damage resistance, and a reactive layer that responds to a local damaging force applied to a limited area of the cable, so as to form a localized self-healed region, The self-healed region corresponds in size and location to the limited area of the damaging force, and has an enhanced damage resistance as compared to the initial damage resistance of the protective layer.

Another aspect of the invention is a self-healing cabling method that includes providing the self-healing cable apparatus of the present invention, and incorporating the self-healing cable into a structure capable of damaging the cable with a damaging force.

Figure 1:
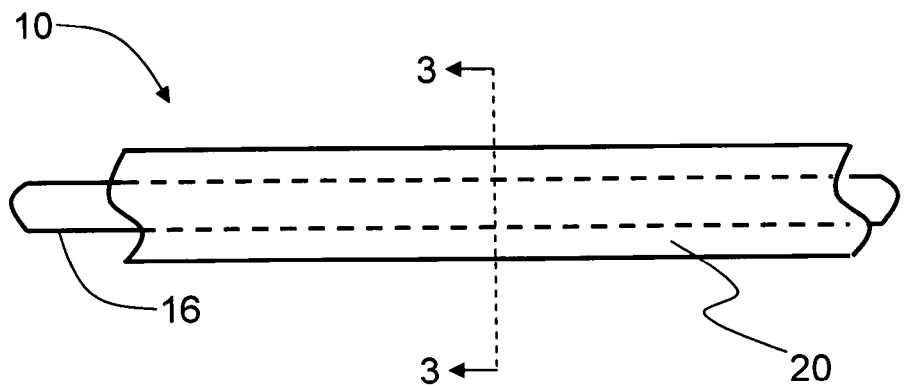
FIG. 1 is a cut-away partial side view of an example cable according to the present invention, showing a central conductor surrounded by the adaptive cover.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art.

DETAILED DESCRIPTION OF INVENTION

The present invention addresses the problem of repairing damage (e.g., wear, abrasion, chafing, puncture, slicing, heating, etc.) to various types of cables by providing the cable with an adaptive covering that allows the cable to self-heal when damaged. The cable of the present invention serves to reduce the susceptibility to damage after installation, for instance, by employing an adaptive cover that reacts to the cause of damage to produce a damage-resistant (e.g., less flexible but significantly tougher) covering in the damaged area(s).

In the present invention, the term "conductor" is used broadly and includes electrical conductors (e.g., cables, metal wiring, etc.), optical conductors (e.g., optical fibers, optical fiber cables, optical waveguides, etc.), fluid (i.e., gas, liquid, vacuum) conductors (e.g., transfer tubing), and the like. For the sake of discussion, the term "conductor" includes or is synonymous with the term "conductive core."

Further, the term "cable" is used in the broad sense to describe a conductor in combination with the adaptive cover of the present invention, as described below.

Also, the term "damage" is used herein in the general sense and can be any type of harm to the cable caused by a force, referred to herein as a "damaging force," of sufficient nature and strength to put the cable's normal operation at risk. Examples of a damaging force include such physical actions as wearing, abrasion, chafing, puncturing, slicing, tearing, melting, cracking, bending, electrical arcing, radiation, etc., acting either alone or in combination.

Cable Apparatus and Method of Manufacture

FIG. 1 is a side view of an example cable 10 according to the present invention. Cable 10 includes a central conductive core ("conductor") 16 surrounded by an adaptive cover 20 that engages the conductor. Adaptive cover 20 includes at least one reactive layer (discussed below) that comprises a material that enhances the cable's initial resistance to damage in response to subsequent damage, e.g., after or during cable installation.

Adaptive cover 20 is adapted to locally react to damage to the cable in a manner that locally protects the conductor in and around the area of damage so that the cable can operate safely, preferably at or near its normal operating conditions. In an example embodiment, adaptive covering 20 becomes locally tougher and/or stiffer, or otherwise changes its properties (e.g., expands) to inhibit further damage to the cable. The toughening reaction is kept local (i.e., substantially limited to the region of damage) by self-limiting chemical reactions and/or by physical barriers. The various example embodiments set forth below illustrate several different ways in which adaptive covering 20 locally adapts to damage in order to preserve the safe operation of cable 10 in the affected region.

Certain cabling applications have requirements for ease of installation and routing of cables through complex geometries. Such requirements often dictate that the cable be flexible during the installation process. This prohibits the use of very hard, durable coverings. However, after installation, the conductors can be subject to a damaging force by virtue of ordinary use or through extraordinary circumstances (e.g., an accident).

In one example embodiment of cable 10, adaptive covering 20 extends substantially over an entire length of the cable, so that the self-healing property of the cable is present over most if not all of the cable's length. In another example embodiment, adaptive covering extends over one or more portions of the cable's length. This latter example embodiment is suitable, for example, in situations where the cable 10 will experience damaging forces at known locations when the cable is installed in a structure, e.g., such as threading the cable through regularly spaced plates or bulkheads.

Structure with Incorporated Cable

Figure 2:
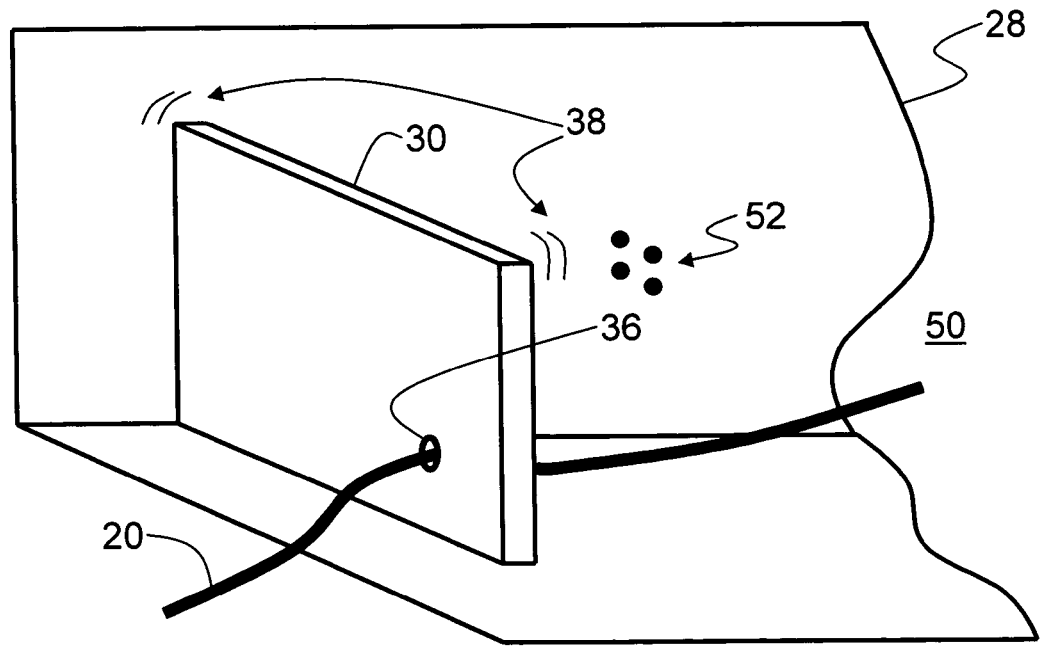
FIG. 2 is a perspective view of a generic structure having a plate with an aperture formed therein and a cable of the present invention passing therethrough, illustrating how a structure can subject a cable to a localized damaging force.

FIG. 2 is a perspective partial view of a structure 28 that includes a plate 30 with an aperture 36 formed therethrough. Cable 10 of the present invention passes through aperture 36. Structure 28 is a generic example of an application wherein the cable of the present invention is incorporated into the structure and interacts therewith in a way that subjects the cable to a localized damaging force. For example, structure 28 can be an airplane fuselage and plate 30 can be an airplane bulkhead that vibrates because of normal aircraft operation. Cable 10 in this example may be a control cable that operably connects controls in the airplane cockpit to another part of the plane, such as the wing flaps or tail rudder. Hash marks 38 in FIG. 2 illustrate plate movement (e.g., vibration).

Structure 28 has an associated ambient environment 50 in which cable 10 resides. In an example embodiment, ambient environment 50 contains a constituent 52, such as moisture, that is capable of curing a material in cable 10, as described in greater detail below.

Damage to cable 10 at the location of the plate aperture due to a damaging force in the form of plate vibration, for example, will ultimately cause a reaction in adaptive cover 20. The reaction results in the formation of a localized self-healed region (discussed below) in the cable that reduces the effect of the damage at the location where the damaging force occurs. The particular type of self-healed region depends on the type of adaptive cover 20, examples of which are discussed in detail below.

Because the self-healed region is local to the area of damage, the rest of the cable remains unaffected. For example, for a flexible cable 10, the unaffected parts of the cable remains flexible to facilitate such things as movement of the cable due to movement of control surfaces, or removal of the cable. On the other hand, the self-healed region stiffens and toughens to protect the cable form the source of damage to enhance the resistance to damage as compared to the initial damage resistance of the cable. Cables that do not remain flexible in non-damaged locations limit cable movement and tend to be difficult to remove and replace.

In an example embodiment, adaptive cover 20 is designed to provide a self-healed region of a desired relative size so that it protects an appropriate portion of cable 10 relative to the damaged area and/or where the damaging force is present. The self-healing nature of cable 10 eliminates the need for bulkhead grommets and other cable-protecting devices, and also contributes greatly to the safety of a wide variety of systems having cables that, when damaged, present a safety hazard.

In the case where conductor 16 is electrically conductive, the material(s) selected for the reactive layer of adaptive cover 20 are preferably selected to provide suitable electrical insulation for the conductor to prevent shorting, arcing, etc., when the cable is damaged and then self-healed. In an embodiment wherein the reactive layer includes multiple sub-layers, one, some or all of the layers may be electrically insulating.

In the case where conductor 16 is hydraulically or pneumatically conductive, the material(s) selected for the reactive layer of adaptive cover 20 are preferably selected to provide suitable sealing of the conductor to prevent leakage when the cable is damaged and then self-healed. In an embodiment wherein the reactive layer includes multiple sub-layers, one, some or all of the layers may be sealing.

EXAMPLE EMBODIMENTS

Five example embodiments of the present invention are now set forth that illustrate various constructions of cable 10 and adaptive cover 20 and how the adaptive cover reacts to a damaging force to provide self-healing of the cable. Experiments relating to some of the example embodiments set forth below were performed by the inventors, and are described in the publication by B. Esser et al., entitled "Active self-healing wire insulation," Proceedings of SPIE, Vol. 5762 Smart Structures and Materials 2005: Industrial and Commercial Applications of Smart Structures Technologies, Edward V. White, Editor, May 2005, pp. 8-16, which publication is incorporated herein by reference.

Also, each of the example embodiments of cable 10 discussed below can have additional conventional protective layers. An example of such a protective layer (114) is discussed only in connection with first example embodiment for ease of illustration and discussion. In the present invention, such additional protective layers are used in conjunction with adaptive layer 20 when, for example, the reaction time of the self-healing process calls for additional protection of conductor 16 during the self-healing process.

In an example embodiment, the localized self-healed region (discussed below) formed by the adaptive covering is generally more resistant to damage and is less flexible than undamaged parts of cable 10 because of the curing reaction of the material making up the reactive layer. Cable 10 is thus capable of adapting to a damage-prone environment by providing additional toughness and wear resistance at the localized self-healed region. This is particularly useful because the installation and/or removal of the cable is not hampered by having to make the entire cable overly stiff and cumbersome just to ensure protection from damage from a localized damaging force.

First Example Embodiment

Figure 3:
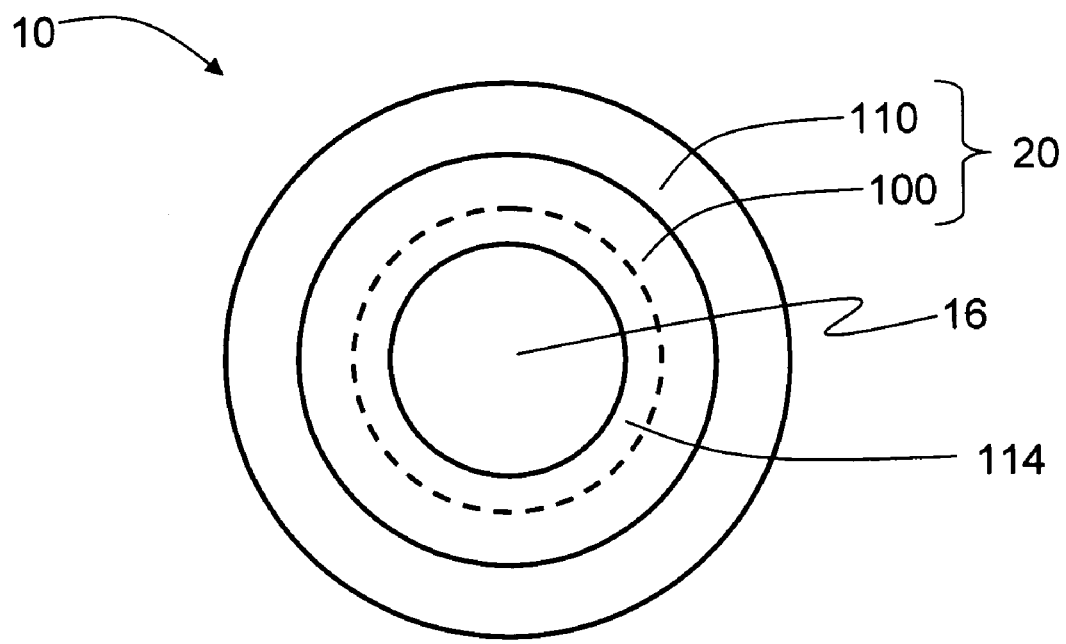
FIG. 3 is face-on view of the cable of the present invention as viewed in direction of arrows 3-3 in FIG. 1, showing the conductor and the surrounding adaptive cover for a first example embodiment according to the present invention that employs an inner reactive layer that reacts to a constituent in the environment when the outer protective cover is breached.

FIG. 3 is a cross-sectional view of a first example embodiment of cable 10 of FIG. 1, viewed in the direction of arrows 3-3. As discussed above in connection with FIG. 1, cable 10 includes conductor 16 surrounded by adaptive cover 20. In the present example embodiment, adaptive cover 20 includes an inner reactive layer 100 surrounding conductor 16. Inner reactive layer 100 is surrounded by a protective outer layer 110. As mentioned above, in an example embodiment, cable 10 includes an optional additional protective layer 114 (dashed line), here shown arranged between conductor 16 and inner layer 100.

Inner reactive layer 100 contains a material that cures in the presence of a constituent 52 in the environment 50 surrounding cable 10 (see FIG. 2). In an example embodiment, constituent 52 is moisture. Examples of materials for inner layer 100 include urethane, silicone, conventional epoxy, and the like. Outer layer 110 is impermeable to the particular environmental curing constituent. Example materials for outer layer 110 include conventional materials used for cable coverings, such as polyvinylidene fluoride, TEFLON, KAPTON (both trademarks of Dupont Corporation), and the like.

Figure 4:
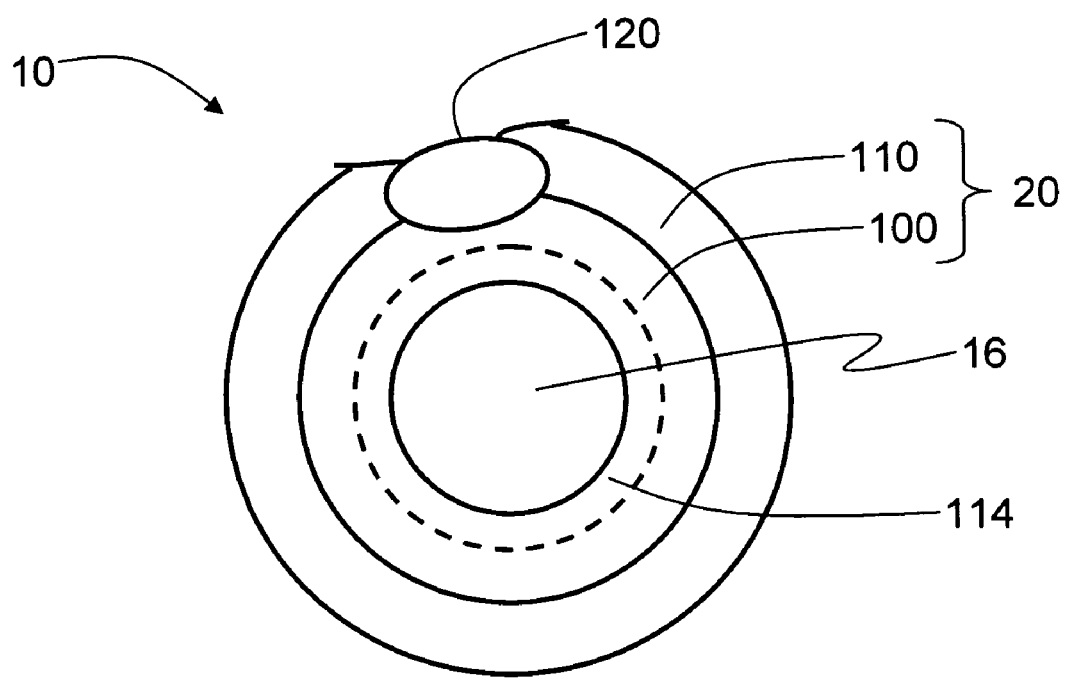
FIG. 4 is the same cross-sectional view as FIG. 3, but showing the resulting localized self-healed region produced by the adaptive cover when the cable is subject to a damaging force that exposes the material in the reactive inner layer, which then locally cures and hardens.

In the self-healing operation of cable 10 of FIG. 3, when a damaging force causes protective outer layer 110 to be breached, reactive inner layer 100 is exposed to the curing constituent. This causes the material in the exposed region of reactive inner layer 100 to cure, as well as the regions immediately adjacent the damaged area. This creates a localized self-healed region 120, as illustrated in FIG. 4.

Second Example Embodiment

Figure 5:
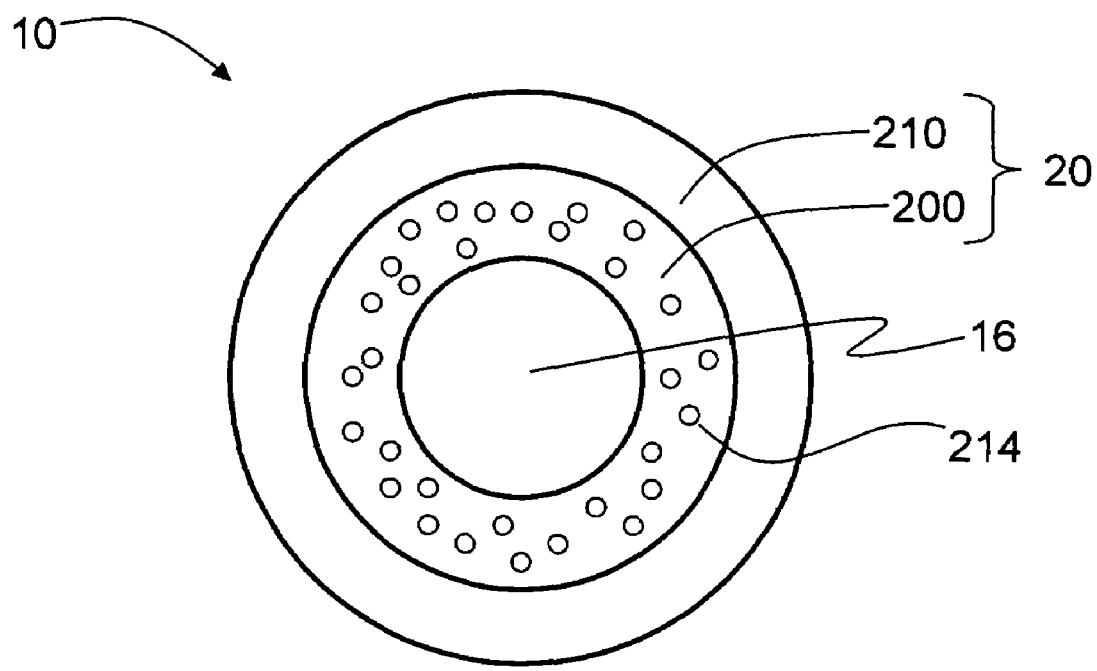
FIG. 5 is face-on view of the cable of the present invention as viewed in direction of arrows 3-3 in FIG. 1, showing the conductor and the surrounding adaptive cover for a second example embodiment according to the present invention that employs an inner reactive layer with microcapsules that contain a curing agent for material that makes up the reactive layer.

FIG. 5 is a cross-sectional view of a second example embodiment of cable 10 of FIG. 1, viewed in the direction of arrows 3-3. In the present example embodiment, adaptive cover 20 includes an inner reactive layer 200 surrounding conductor 16, and an outer protective layer 210 surrounding the curable inner layer. Reactive layer 200 includes a curable material along with frangible microcapsules 214, which contain a curing agent for the surrounding curable material in the inner curable layer.

In an example embodiment, reactive layer 200 includes a curable material, such as an epoxy resin, urethanes and silicones, etc., that is cured (i.e., toughened and/or hardened) by the corresponding curing agent (e.g., hardeners, oxidizers and catalysts, etc.), contained in microcapsules 214. Microcapsules 214 is made of a suitable material, e.g., urea-formaldehyde, that protects the curing agent and keeps it isolated from the surrounding curable material, but that is also frangible so that it breaks when subject to a damaging force sufficient to breach protective outer layer 210. Microcapsules 214 suitable for use with the present invention are well-known in the art.

Figure 6:
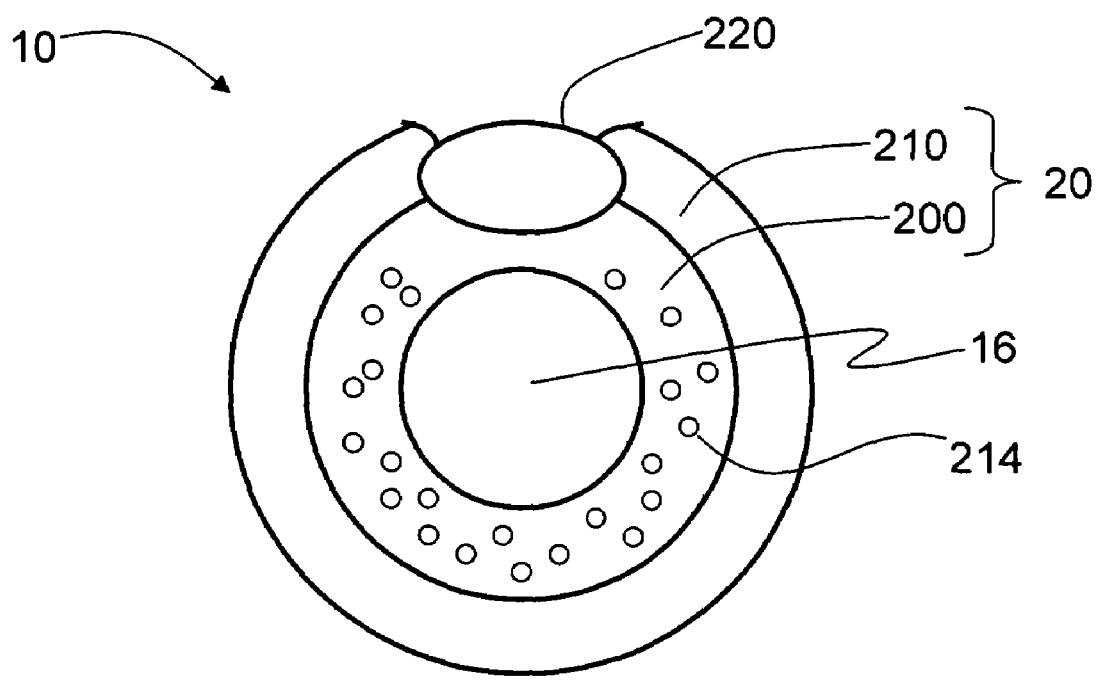
FIG. 6 is the same cross-sectional view as FIG. 5, but showing the resulting localized self-healed region produced by the adaptive cover when the cable is subject to a damaging force sufficient to rupture the microcapsules in the area of damage so that the curing agent therein locally mixes with the material in the reactive inner layer and hardens.

In the self-healing operation of cable 10 of FIG. 5, when the local damage to the cable is sufficient to breach outer protective layer 210, curable inner layer 200 is exposed to the damaging force. This damage force—say, for example, abrasion or chafing from a bulkhead aperture (see FIG. 2)—continues to act on the exposed reactive layer 200, thereby rupturing microcapsules 210 present at the location of the cable damage. This releases the curing agent contained with the microcapsules into the curable material surrounding the ruptured microcapsules. This in turn locally cures the curable layer, resulting in a toughened and/or hardened localized self-healed region 220, illustrated in FIG. 6.

Third Example Embodiment

Figure 7:
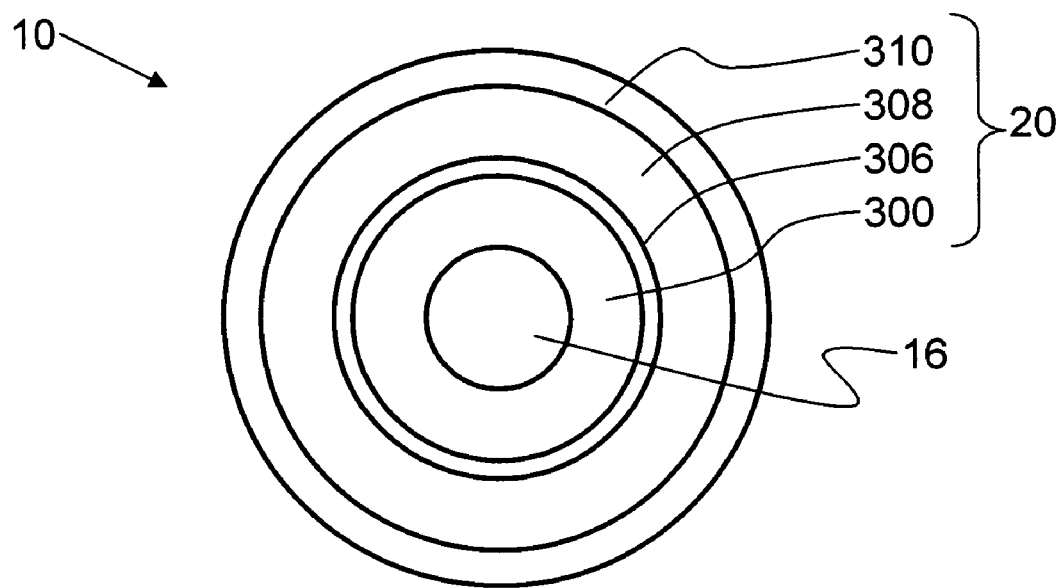
FIG. 7 is face-on view of the cable of the present invention as viewed in direction of arrows 3-3 in FIG. 1, showing the conductor and the surrounding adaptive cover for a third example embodiment according to the present invention wherein the reactive layer includes first and second layers of material separated by a barrier layer, wherein the first and second layers contain materials that cure when mixed.

FIG. 7 is a cross-sectional view of a third example embodiment of cable 10 of FIG. 1, viewed in the direction of arrows 3-3. In the present example embodiment, adaptive cover 20 has a reactive layer that includes first and second concentric layers 300 and 308 that surround conductor 16 and that are separated by a frangible barrier layer 306. Adaptive cover 20 also includes a flexible protective outer layer 310 surrounding second layer 308. First and second layers 300 and 308 include materials that cure when mixed or brought into contact. Examples of suitable two-part curing mixtures for first and second layers 300 and 308 include conventional epoxies (e.g., an epoxy resin and a curing agent). Frangible barrier layer 306 is made of a material that ruptures when a damaging force is applied to the cable. An example material for frangible barrier layer 306 is a membrane made from polyurethane (others may be poly(urea urethane), poly(urea formaldehyde), and gelatin.

Figure 8:
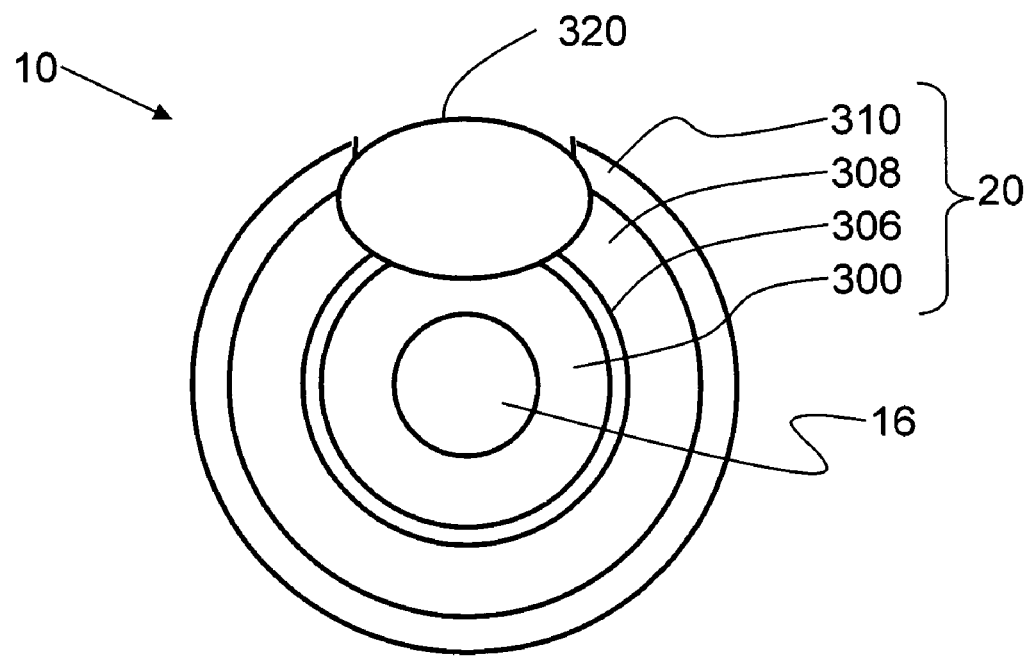
FIG. 8 is the same cross-sectional view as FIG. 7, but showing the resulting localized self-healed region produced by the adaptive cover when the cable is subject to a damaging force sufficient to breach the barrier layer so as to allow the material in the two layers to locally mix and harden.

In the self-healing operation of cable 10 of FIG. 7, when the cable is subjected to a damaging force of sufficient strength, frangible barrier layer 306 separating the materials in layers 300 and 308 locally ruptures, allowing the materials in the layers to mix and cure at and around the location of the damage. This forms a localized self-healed region 320, as shown in FIG. 8, having increased toughness and/or hardness as compared to the undamaged regions of the cable.

Fourth Example Embodiment

Figure 9:
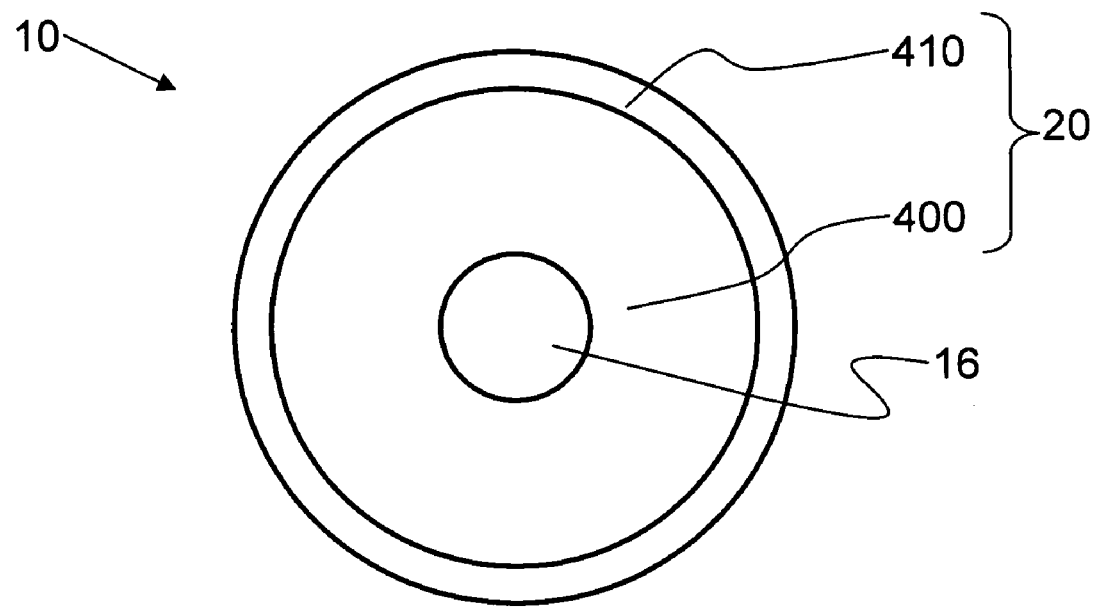
FIG. 9 is face-on view of the cable of the present invention as viewed in direction of arrows 3-3 in FIG. 1, showing the conductor and the surrounding adaptive cover for a fourth example embodiment according to the present invention wherein the reactive layer includes an insulating foaming material.
Figure 10:
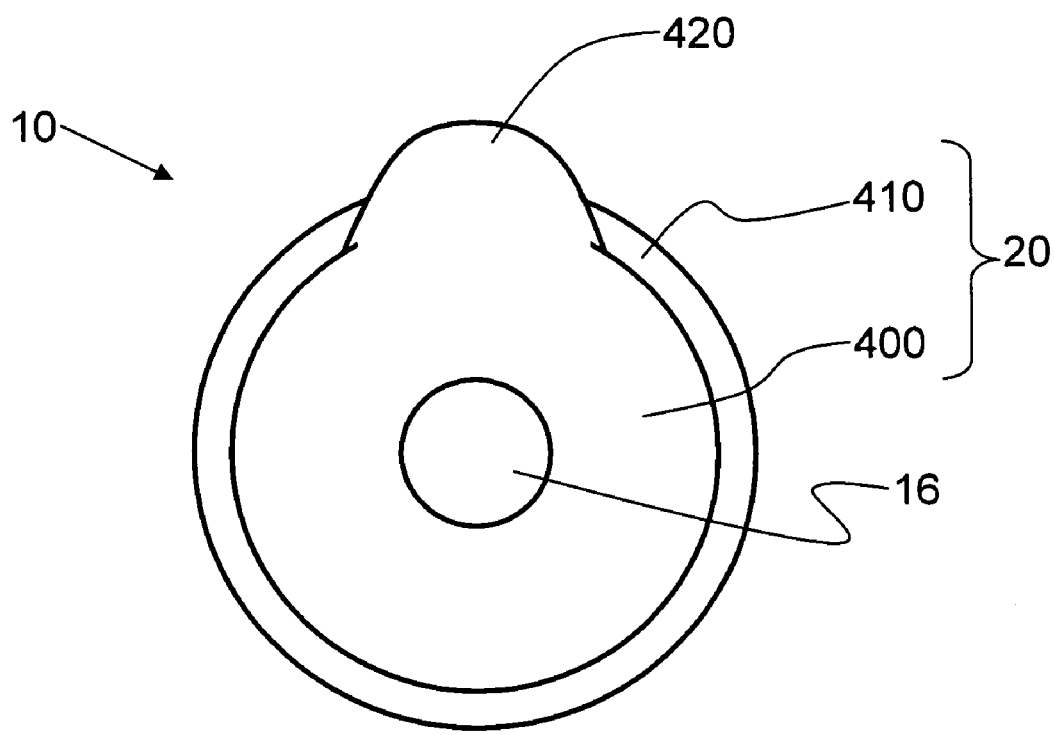
FIG. 10 is the same cross-sectional view as FIG. 9, but showing the resulting localized self-healed region produced by the adaptive cover when the cable is subject to a damaging force that breaches the outer layer, causing the foam in the inner layer to expand into the region of the damage.

FIG. 9 is a cross-sectional view of a fourth example embodiment of cable 10 of FIG. 1, viewed in the direction of arrows 3-3. In the present example embodiment, adaptive cover 20 includes a reactive layer 400 surrounding conductor 16, and a protective covering 410 that surrounds the reactive layer. Reactive layer 400 includes a foaming material, such as foaming polyurethane, that is activated (e.g., expands and hardens) when exposed to a constituent 52, such as heat or moisture, in the cable's ambient environment 50 (see FIG. 2).

In the self-healing operation of cable 10 of FIG. 9, when the cable is subjected to a damaging force sufficient to breach protective layer 410, the foam in reactive layer 400 expands into the breach and reacts with a constituent in the ambient environment to harden, thereby forming a localized self-healed region 420.

Depending upon the objects or other structures located immediately adjacent the damage region, in the present example embodiment, the foam released by reactive layer 400 adheres to or otherwise engages the surrounding object (s) or structure(s), thereby immobilizing cable 10 relative to the object(s) or structure(s). For example, with reference again to FIG. 2, cable 10 may be damaged by abrasion/ chafing by the edges of an aperture 36 from vibration or movement of plate 30. This damaging force can cause a breach in protective layer 410, causing the foaming material in layer 400 to expand into the breach and into aperture 36. When the foam hardens, it fixes the cable to plate 30, thereby mitigating the damaging force. This process is referred to by the inventors as "self-grommetizing."

The present example embodiment is particularly useful when there is abrasion or chafing between cable 10 having a metal conductor 16 and a metal portion of a structure, such as the edges of aperture 36 in (metal) plate 30, as discussed above in connection with FIG. 2. If such abrasion or chafing penetrates to metal conductor 16, sparking, arcing or shorting can occur between the now-exposed conductor 16 and the metal plate 30. In this scenario, the foam released by foam layer 400 acts re-insulate and separate metal conductor 16 from metal plate 30 that caused the arcing, sparking or shorting to occur.

In connection with the present embodiment of the invention, U.S. Pat. No. 4,460,546 to Kapralis et al. and entitled "Trigger to controllably initiate crystallization," discloses an exothermic reaction to initiate a change in structure that is useful in connection with the present example embodiment of the invention, and is incorporated herein by reference. Also, U.S. Pat. No. 6,284,077 to Lucas et al., entitled "Stable, foamed caulk and sealant compounds and methods of use thereof," which is incorporated by reference herein, discloses an example of a foaming latex material (known under the trademarked named DAPtex and available from DAP Products, Inc. of Baltimore, Md.) that can be used as the foaming material in the active layer 400.

Fifth Example Embodiment

Figure 11:
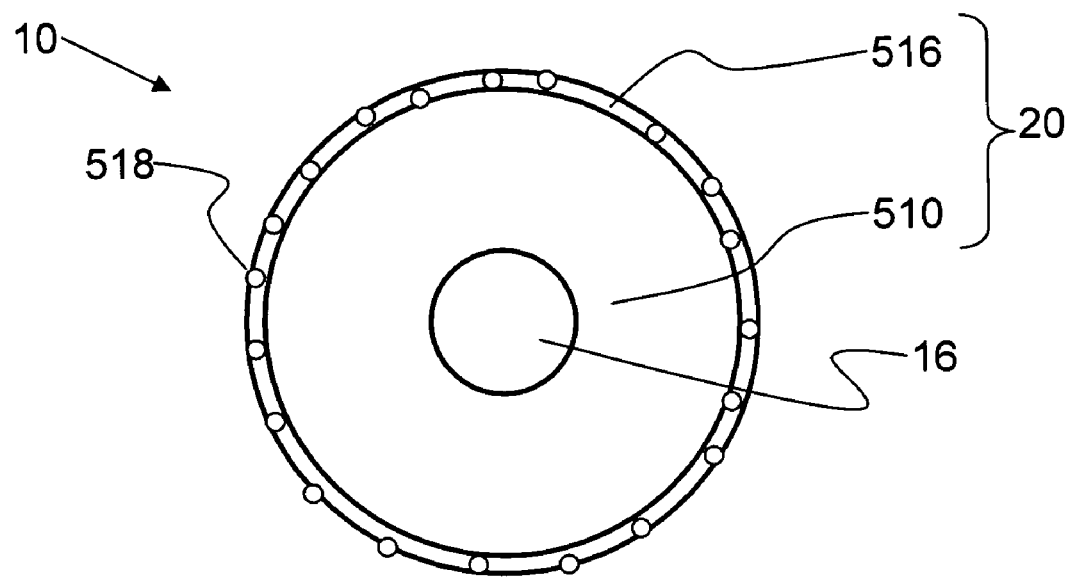
FIG. 11 is face-on view of the cable of the present invention as viewed in direction of arrows 3-3 in FIG. 1, showing the conductor and the surrounding adaptive cover for a fifth example embodiment according to the present invention wherein the reactive layer surrounds the protective layer and includes microcapsules incorporated therein and/or thereon, wherein the microcapsules contain a curable material that cures when exposed to a constituent in the environment surrounding the cable.

FIG. 11 is a cross-sectional view of a fifth example embodiment of cable 10 of FIG. 1, viewed in the direction of arrows 3-3. In the present example embodiment, adaptive cover 20 includes a protective layer 510, made up of a conventional cabling material, surrounding conductor 16, and a reactive layer 516 surrounding the protective layer. Reactive layer 516 includes microcapsules 518 that contain a curable material. Like microcapsules 214 in the second example embodiment described above, microcapsules 518 are made from a protective, yet rupturable, shell, such as made from urea-formaldehyde. The curable material contained with microcapsules 518 may be, for example, epoxy resin and the like, that cures when exposed to constituent 52 in the cable ambient environment 50 (FIG. 2).

In an example embodiment, layer 516 includes a coating material, such as epoxy hardener, and microcapsules 518 adhere to the coating material. In an example embodiment, microcapsules 518 are added to layer 516 during manufacture or just prior to installing cable 10. Once microcapsules 518 are integrated into adaptive covering 20, care is needed to avoid rupturing the microcapsules unintentionally. In this regard, the cable can be stored in a removable protective cover (not shown) until it is ready to be installed, or alternatively is installed with the cover, which is then removed after installation.

Figure 12:
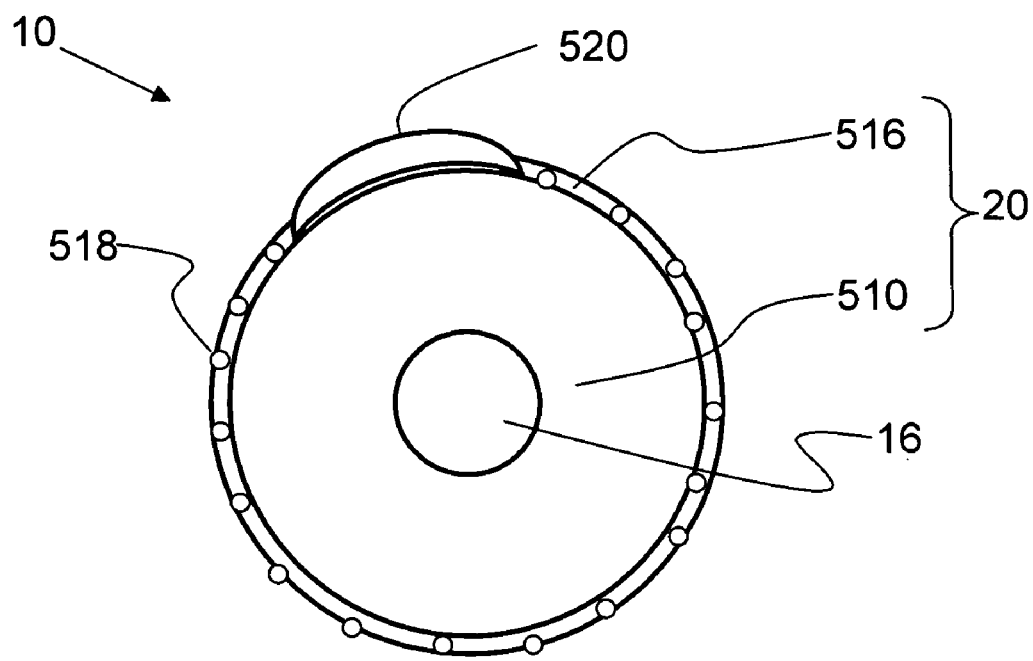
FIG. 12 is the same cross-sectional view as FIG. 11, but showing the resulting localized self-healed region produced by the adaptive cover when the cable is subject to a damaging force such that the microcapsules in the location of the damage are ruptured, causing the curable material contained therein to flow onto the outer covering and harden.

In the self-healing operation of cable 10 of FIG. 11, when the cable is subjected to a sufficient damaging force, microcapsules 518 present at the location of the damaging force break, allowing the curable material therein to flow onto protective layer 510. The curable material then cures to form a hardened/toughened localized self-healed region 520, as illustrated in FIG. 12.

Applications of the Self-Healing Cable of the Present Invention

There are many diverse applications for cable 10 and adaptive cover 20 of the present invention. Applications include, for example, the automotive, aerospace, military, commercial, industrial, and consumer applications and technologies. In fact, any situation where damage to a cable can lead to a failure of the cable or the system in which the cable is used can benefit from the present invention.

It is to be understood that description of the invention set forth herein is based on a number of embodiments of the invention. These example embodiment are intended to provide an overview or framework for understanding the nature and character of the invention as claimed. The accompanying drawings are included to provide a further understanding of the invention, and are incorporated into and constitute a part of this specification. The drawings illustrate various embodiments of the invention, and together with the description serve to explain the principles and operations of the invention.

Accordingly, it will be apparent to those skilled in the art that various modifications and variations can be made to the present invention without departing from the spirit and scope of the invention. Thus, it is intended that the present invention cover the modifications and variations of this invention within the scope of the appended claims and their equivalents.

What is claimed is:

1. A self-healing cable apparatus, comprising:
   a central conductor having a length;
   an adaptive covering surrounding the conductor at least over a portion of its length, the adaptive covering including a protective layer having an initial damage resistance, and a reactive layer; and
   wherein, when a damaging force is applied to the cable over a limited area of the cable, the reactive layer responds so as to form a localized self-healed region corresponding in size and location to said limited area and that has an enhanced damage resistance as compared to said initial damage resistance and that is capable of resisting further damage from the damaging force.

2. The cable apparatus of claim 1, wherein the reactive layer comprises a material curable when exposed to a constituent in an ambient environment of the cable, and wherein the protective layer surrounds the reactive layer so as to prevent the reactive layer from being exposed to said ambient environment unless the cable is damaged.

3. The cable apparatus of claim 1, wherein the reactive layer comprises a curable material and the reactive layer includes frangible microcapsules each containing a curing agent for curing said curable material.

4. The cable apparatus of claim 1, wherein the reactive layer comprises first and second concentric layers that respectively include first and second parts of a two-part curable material, with the first and second layers being separated by a frangible barrier layer.

5. The cable apparatus of claim 1, wherein the reactive layer comprises a foaming material.

6. The cable apparatus of claim 5, wherein the foaming material is adapted to interact with a structure nearby to or surrounding the cable so as to fix the cable to the structure.

7. The cable apparatus of claim 1, wherein the reactive layer surrounds the protective layer and includes a plurality of microcapsules that each contains a material that cures when exposed to a constituent in an ambient environment of the cable.

8. The cable apparatus of claim 1, wherein the adaptive covering extends substantially over the entire length of the cable.

9. The cable apparatus of claim 1, wherein the adaptive covering extends over one or more portions along the length of the cable.

10. The cable apparatus of claim 1, wherein the reactive layer includes at least one conventional epoxy material.

11. The cable apparatus of claim 1, wherein the reactive layer includes both a conventional epoxy resin and an epoxy curing agent.

12. A method of manufacturing a self-healing cable, comprising:
    providing a central conductor having a length;
    surrounding the central conductor over at least a portion of its length with an adaptive covering that includes a protective layer having an initial damage resistance and a reactive layer that responds to a local damaging force applied to a limited area of the cable, so as to form a localized self-healed region corresponding in size and location to said limited area and that has an enhanced damage resistance as compared to said initial damage resistance of the protective layer and that is capable of resisting further damage from the damaging force.

13. The method of claim 12, including forming the reactive layer to include a material curable when exposed to a constituent in an ambient environment of the cable, and forming the protective layer that surrounds the reactive layer to prevent the reactive layer from being exposed to said ambient environment unless the cable is damaged.

14. The method of claim 12, including forming the reactive layer to include a curable material and frangible microcapsules that each contain a curing agent for curing said curable material.

15. The method of claim 12, including:
    forming the reactive layer to include first and second concentric layers that respectively include first and second parts of a two-part curable material; and
    separating the first and second layers with a frangible barrier layer.

16. The method of claim 12, including the step of forming the reactive layer to include a foaming material that expands and hardens when released from the reactive layer.

17. The method of claim 12, including forming the reactive layer around the protective layer and providing the reactive layer with a plurality of microcapsules that each contains a material that cures when exposed to a constituent in an ambient environment of the cable.

18. A self-healing cabling method, comprising:
    providing the self-healing cable of claim 1;
    incorporating the self-healing cable into a structure capable of damaging the cable with a damaging force.

* * * * *